Feb. 19, 1957 W. LÖBBE 2,781,888
FLEXIBLE CONVEYOR HAVING SUCCESSIVELY SHIFTABLE
SECTIONS FOR LONG FACE MINING
Filed May 27, 1948 2 Sheets-Sheet 1

INVENTOR:
Wilhelm Löbbe

Feb. 19, 1957    W. LÖBBE    2,781,888
FLEXIBLE CONVEYOR HAVING SUCCESSIVELY SHIFTABLE
SECTIONS FOR LONG FACE MINING
Filed May 27, 1948    2 Sheets-Sheet 2
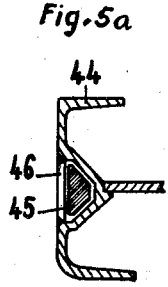
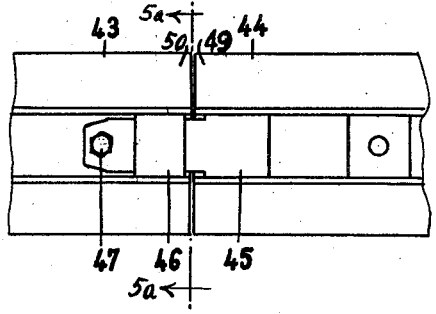
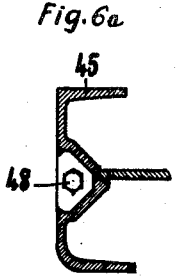
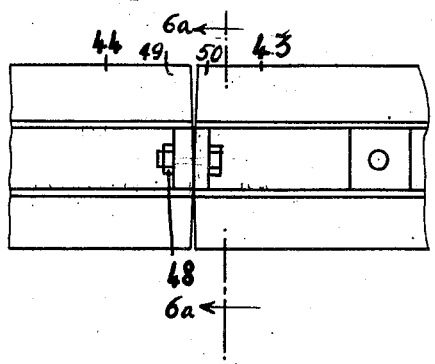

United States Patent Office 2,781,888
Patented Feb. 19, 1957

2,781,888

FLEXIBLE CONVEYOR HAVING SUCCESSIVELY SHIFTABLE SECTIONS FOR LONG FACE MINING

Wilhelm Löbbe, Oberaden, Germany, assignor to Gewerkschaft Eisenhutte Westfalia, Lunen, Germany, a firm Application May 27, 1948, Serial No. 29,484

Claims priority, application France July 2, 1947

5 Claims. (Cl. 198—109)

This invention relates to new and useful improvements in shiftable conveyor for long face mining.

One object of the invention comprises among others a laterally flexible conveyor of the endless type for the long face mining of coal.

Another object of the invention comprises such a conveyor laterally flexible in sections.

Still another object of the invention comprises such a conveyor substantially vertically flexible to adapt itself to ridges and depressions along seam floors.

Yet another object of the invention comprises a laterally and preferably also vertically flexible conveyor of the endless type for the long face mining of coal in combination with multiple jacks for the successive shifting of conveyor sections coordinated to the passage of the coal cutter along the conveyor. Though any suitable jack member is useful in accordance with the invention, I have illustrated the same by way of exemplification in connection with a pawl and ratchet type jack. One construction of this type jack involves the use of racks having serrated rails; the racks are arranged over the whole length of the conveyor; each rack cooperates with a rigidly arranged pawl. The racks are with play mounted on the conveyor; their top ends are opposite to the side wall of the conveyor; a double arm lever is furthermore mounted on the conveyor, one end of said lever being flexibly connected with the rack. A wedge shaped slide glides along the conveyor; on moving between the top end of the rack and the conveyor the slide is wedged and the conveyor shifted laterally as the rack cannot give way. On moving in the opposite direction the slide swings the lever mounted on the rack and conveying trough and drags after the rack as the rack offers less resistance than the heavy conveying trough.

Further features of the invention will be apparent from the description taken in connection with the accompanying drawings in which:

Fig. 5 is the view and cross section of the elastic connection of two sections of the conveying trough;

Fig. 5a is a sectional view of the bar 46 viewed on section line 5a—5a of Fig. 5;

Fig. 6 is the view and cross section of the rigid connection of two sections of the trough;

Fig. 6a is a sectional view of the bolt 48 viewed on section line 6a—6a of Fig. 6;

Figure 1:
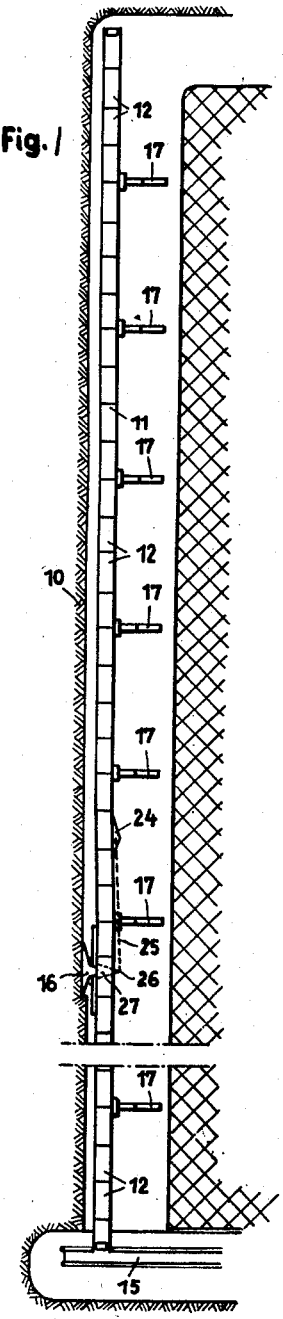
Fig. 1 is a plan view of a coal mining installation comprising a conveyor.
Figure 2:
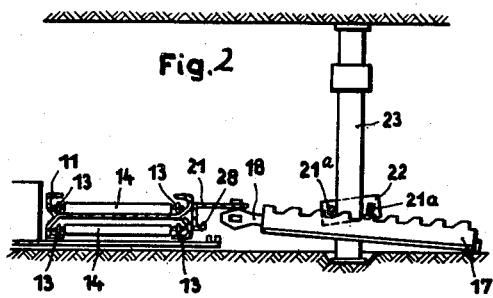
Fig. 2 is a corresponding cross section.

As shown in Fig. 1 the conveyor 11, the stationary trough of which is composed of separate sections 12, is situated in front of the coal face 10. A scraper flight conveyor consisting of the two laterally arranged chains 13 and the scrapers 14 is moving within the conveying trough 11. As may be seen from Fig. 2 of the drawing the scraper flight conveyor is returned under the conveying trough. The conveyor 11 transfers the coal into the conveyor 15.

A coal planer and loader 16—the term planer is exclusively used in the following description—is guided at the side of the conveyor; a small cutting of coal is detached from the coal face 10 and loaded into the conveyor 11 by the planer on its travel and return along the coal face. In order to ensure that successive cuts can be taken the conveyor 11 which is used as a guide rail must continuously be shifted towards the coal face. The shifting operation is automatically carried out by a machine which firstly consists of a number of racks 17 the top ends of which are according to Figs. 2 and 3 of the drawing loosely secured to the conveyor 11 by means of the double arm levers 19 and 20 which are mounted on a supporting plate 21 of the conveyor 11; the opposing ends of said levers 19 and 20 engage with a transverse opening in the top end 18 of the rack 17.

The rack 17 can consist of a serrated rail or of two rails as shown in the drawing. The rack 17 cooperates with a pawl which automatically engages with the teeth of the rack 17. Two pawls of this kind are preferably provided and arranged in successive alignment a distance from one another of a half rack tooth pitch or multiple thereof in the direction of the rack 7 thereby assuring that one pawl is always in ratchet engagement. The two pawls 21a are made in such a way as to form the cross bars of a frame which are connected by the side bars 22. The frame 21a, 22 surrounds loosely support 23.

The shifting of the conveyor is actuated by means of a wedge shaped slide 24 which is hauled by means of a chain 25 which is fastened at 26 in the base plate 27 of the planer 16. The base plate 27 lies underneath the whole width of the conveyor 11 so that the slide 24 travels and returns at the same speed as the planer 16 along the coal face. The slide 24 is guided on a rail 28 at the back of the conveyor 11. As may particularly be seen from Fig. 3 of the drawing the slide is on both its sides wedge shaped. It can under certain circumstances be possible to couple temporarily the slide 24 with the scraper flight conveyor 13, 14 while the planer is disconnected at the upper or lower end of the coal face 10.

The apparatus described is operated in the following manner.

Figure 3:
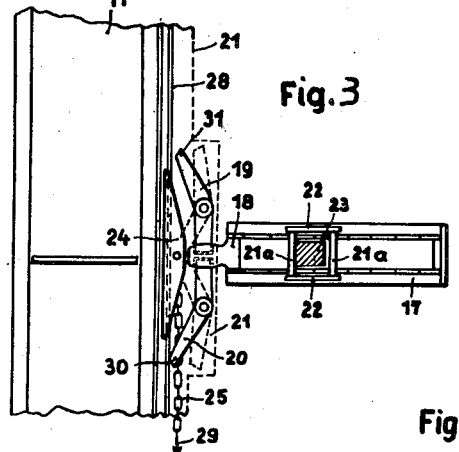
Fig. 3 is a top view of a part of the conveying trough.
Figure 7:
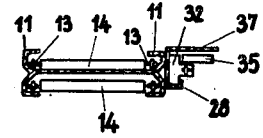
Fig. 7 is a cross-sectional view of a portion of Fig. 4.

When the slide is in the position shown in Fig. 3 it is just wedged between the top end 18 of the rack 17 and the conveyor 11. The rack being prevented by the pawl 21a from moving backward the slide 24 shifts the conveyor 11 by a little way towards the coal face 10. On moving farther in the direction of the dart the slide comes in the working angle of the free end of the lever 20 and rotates the lever as far as the position shown in dotted lines. The consequence is that the lever 20 draws forth the rack 17 towards the conveyor 11. When the slide 24 is returned together with the planer 16, the slide passes by first ineffectively the end 30 of the lever 20. But then again it is wedged between the conveyor 11 and the top end 18 of the rack 17 and then again the conveyor 11 is shifted laterally. Then it rotates the free end 31 of the lever 19 and thereby drags after the rack 17. On passing the rack 17 the slide 24 will practically always shift the conveyor by a certain way towards the coal face 10. When the conveyor shall be shifted laterally by a greater way two or more slides can be connected in series at short distances. When, on the other hand, a shifting is not desired on each passage of the slide one of the levers 19 or 20 is removed. In this case on the travel of the slide only the conveyor is shifted while on the return at first the rack 17 is dragged after. Such a mode of operation can be desired when the coal seam is so high that more coal is cut after each shifting than can be transported by the conveyor. Then the conveyor is shifted laterally but on each second passage of the slide the cutting tool of the planer passes in the meantime the coal face without coal being detached but only loaded into the conveyor 11.

Figure 4:
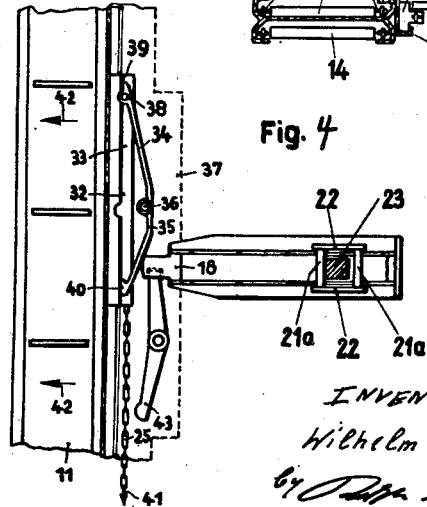
Fig. 4 is a plan view of another construction of the slide.

According to Fig. 4 of the drawing the slide 32 consists of a base rail 33 and a depressible spring pressure skid 34, 35. The two parts 34, 35 of the skid are joined by a link 36 and preferably a spring link tending to draw parts 34 and 35 towards one another in the direction of the arrow 42. The part 34 of the skid is mounted pivotably at 38 on the base rail 33 and supported by means of the shoulder 39 acting as a stop to keep the skid arms 34, 35 in spread position. The free end 40 of the part 35 of the skid rests gliding on the base rail 33.

On moving in the direction of the dart 41 the slide 32 is wedged between the conveyor 11 and the top end 18 of the rack 17 and in consequence thereof the conveyor 11 is shifted laterally in the direction of the arrow 42. Immediately afterwards the slide 32 rotates the lever 43 and thereby drags after the rack 17. When the skid moves in the opposite direction the parts 34 and 35 do not cause a lateral shifting of the conveyor 11 but do collapse and lay themselves against the base rail 33 and the slide 32 passes ineffectively the rack 17.

In order not to interfere with the proper operation of the scraper flight conveyor 13, 14, the conveyor trough is preferably moved out of its longitudinal alignment only a little at a time section by section. With a view to attain this object there is, as indicated, in Fig. 1 of the drawing, arranged a rack 17 not at each section but after each fourth section of the trough. It is only at these spots that a lateral buckling of the trough can take place. This object is, according to Fig. 5 of the drawing, achieved in a very simple manner by connecting the trough sections 43 and 44 on both sides by means of a strap 45 and a bar 46. The reach of the strap 45 is limited by a stop pin 47. On one side of the trough sections 43 and 44 can separate one from another as far as the stop pin 47 meets the bar 46, while, on the other side, the two trough sections butt together at the joints lying in the space between the racks 17. The opposing sides of the adjacent sections are arranged in substantially butting position and have their butt ends 49 and 50 of substantially convex configuration. The bar 46 is shown in the sectional view as seen from the right-hand side of Fig. 5a. The trough sections 44 are according to the arrangement shown in Fig. 6 of the drawing connected to the opposite side of the corresponding trough sections. The sections are connected by means of bolts 48 which has been shown in sectional view as seen from the right-hand side on line 6a—6a of Fig. 6 in Fig. 6a. A lateral buckling of the trough cannot take place at these joints. The connection, however, can be of such a kind as to allow buckling taking place in the vertical plane.

According to Fig. 1 of the drawing a lateral buckling of the conveying trough 11 takes place only at the points where a rack 17 is arranged; the trough 11 is straight lined between two racks each. In addition, no horizontal shifting can take place as regards the sections 12 of the trough 11 lying beyond the last racks 17 at the upper and lower ends of the conveyor where the driving stations for the scraper flight conveyor are arranged.

What I claim is:

1. In a long wall mining planer having a planer cutting head movable along the forward longitudinal portion of a conveyor, a longitudinally extending substantially stationary, laterally flexible trough and endlessly movable conveying means positioned partly within said trough for coal conveying action therein and substantially flexible with said trough, said trough being composed of a multiple number of substantially rigid sections having groups of at least two in number inter-connected for limited lateral angular displacement relative to each other and having intermediate said groups at least one section secured to the sections of adjacent groups, substantially against lateral displacement relative to each other, the improvement which comprises that the inner angle displacement sides of inter-connected trough sections of said groups are arranged in butting position relative to each other, and in which the outer angle displacement sides of such sections are provided with inter-connecting means composed of a strap externally carried by one section side and overlapping the adjacent end of the other section side when said group sections are substantially in alignment, and means positioned for co-operating with said strap and said other section side for limiting the angular displacement between said outer angle displacement sides.

2. Improvement according to claim 1 in which said last-mentioned means comprise an eye member carried by said other section, in which said strap passes through said eye member, and in which said strap carries a stop member for engagement with said eye member upon maximum displacement of said outer angle displacement sides.

3. Improvement according to claim 2 in which a channel is provided on said outer angle displacement sides to receive said strap, in which said eye member is formed by a strip across said channel with the strip surface substantially flush with its outer angle displacement side, and in which said stop member is removably carried by said strap.

4. Improvement according to claim 3 in which said sections which are secured substantially against lateral displacement are substantially rigidly connected to each other by means of eyes and bolts substantially recessed in the outer section surfaces.

5. Improvement according to claim 2 in which all of said sections carry externally on both sides thereof substantially aligned channels, in which said strap is positioned with its base end within said channel and with its free end slidably movable in the channel of the adjacent section, in which said eye member is formed by a strip across the channel of its section with its surface substantially flush with the surface of the section side, in which said stop member is removably carried by said strap, in which said sections which are secured substantially against lateral displacement are substantially rigidly connected to each other by means of eyes and bolts substantially recessed in said channels, and in which said eyes and bolts are arranged to position said bolts substantially longitudinally in said channels.

References Cited in the file of this patent

UNITED STATES PATENTS

| | | |
|---|---|---|
| 1,517,095 | O'Toole | Nov. 25, 1924 |
| 1,561,481 | O'Toole | Nov. 17, 1925 |
| 1,687,306 | O'Toole | Oct. 9, 1928 |
| 1,821,438 | Levin | Sept. 1, 1931 |
| 2,366,407 | Jeffrey | Jan. 2, 1945 |
| 2,373,839 | Madeira | Apr. 17, 1945 |
| 2,379,337 | Bergmann | June 26, 1945 |
| 2,569,004 | Joy | Sept. 25, 1951 |
| 2,590,802 | Tramblay | Mar. 25, 1952 |

OTHER REFERENCES

Bureau of Mines Information Circular #7377; Design and Operation of the Coal Planer, Ruhr District, Germany, by J. W. Buck, published October 1946, Figs. 17 and 19a.